March 13, 1951  B. KELLEY ET AL  2,544,794
HELICOPTER AMPHIBIOUS LANDING GEAR
Filed March 14, 1950
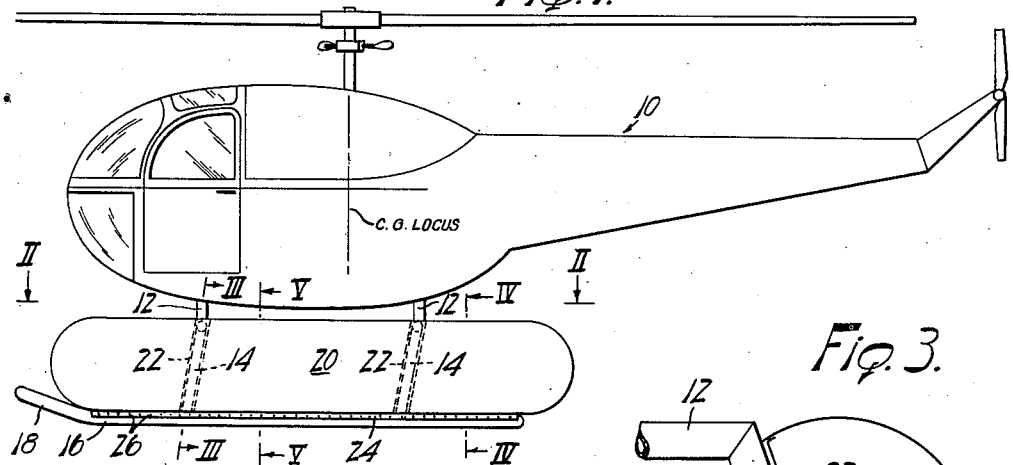
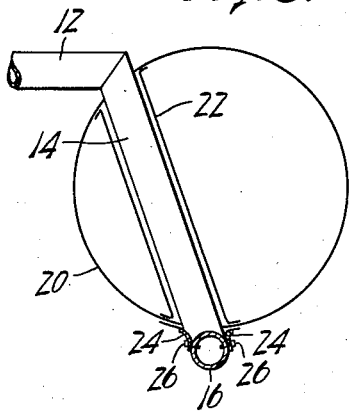
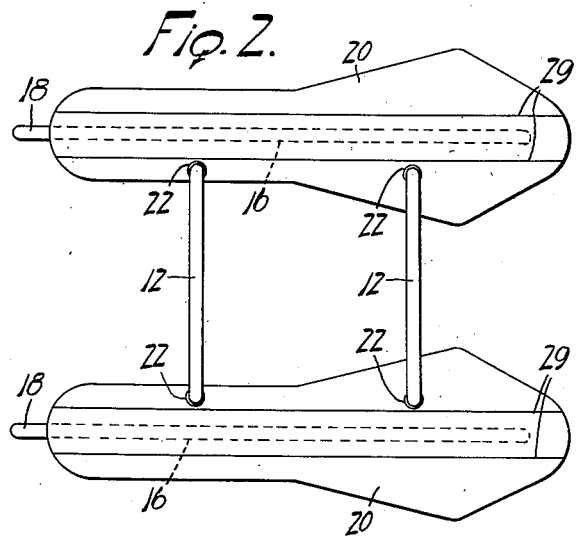
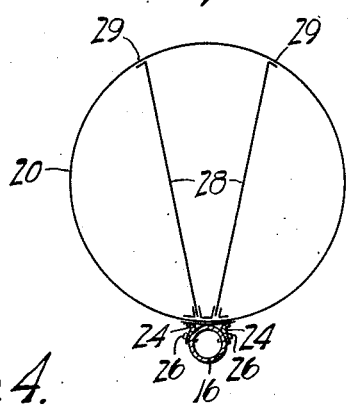
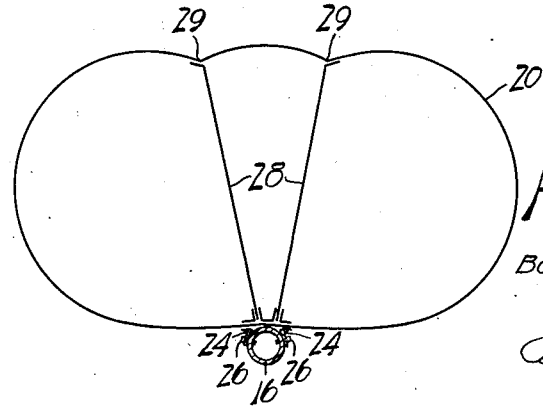
INVENTOR.
Bartram Kelley & Ernest G. Dickinson
BY
Bean, Brooks, Buckley & Bean.
ATTORNEYS Patented Mar. 13, 1951

2,544,794

UNITED STATES PATENT OFFICE 2,544,794

HELICOPTER AMPHIBIOUS LANDING GEAR

Bartram Kelley, Buffalo, and Ernest G. Dickinson, Tonawanda, N. Y., assignors to Bell Aircraft Corporation, Buffalo, N. Y.

Application March 14, 1950, Serial No. 149,572

11 Claims. (Cl. 244—101)

This invention relates to helicopter amphibious landing gear arrangements, and more particularly to improvements in combination ground skid and flotation cell type amphibious undercarriage arrangements.

One of the objects of the invention is to provide an improved combination skid and flotation cell type undercarriage for rotary wing type aircraft or the like.

Another object of the invention is to provide in a combination skid and flotation cell type undercarriage, an improved flotation cell construction.

Another object of the invention is to provide in an undercarriage of the character aforesaid improved means for supporting the flotation cells relative to the strut and skid structures thereof.

Another object of the invention is to provide in an undercarriage structure of the character described, improved means for support of the flotation cell portions thereof relative to the framing structure thereof.

Another object of the invention is to provide an undercarriage of the character aforesaid embodying flotation cells of novel shape.

Other objects and advantages of the invention will appear from the specification hereinafter.

In the drawing:

Fig. 1 is a side elevation of a helicopter type aircraft mounting an amphibious undercarriage arrangement of the invention;

Fig. 2 is a top plan of the undercarriage structure, taken along line II—II of Fig. 1;

Fig. 3 is a fragmentary section, on an enlarged scale, taken along line III—III of Fig. 1, but with the interior webs eliminated;

Fig. 4 is a section, on an enlarged scale, taken along lines IV—IV of Fig. 1; and Fig. 5 is a section, on an enlarged scale, taken along line V—V of Fig. 1.

The invention is illustrated in the drawing in conjunction with a helicopter type aircraft designated generally at 10 having horizontal beam members 12—12 formed of metal tubing or the like, extending at opposite sides thereof from rigid connections to the framework within the body portion of the aircraft. The outer ends of the beams 12—12 carry downwardly extending strut or leg members 14 which may conveniently be fabricated to comprise welded extensions of the beams 12. The legs 14 connect as by welding at their bottom ends to skid devices 16 which comprise metal tubing pieces disposed to extend below and longitudinally of the aircraft at the opposite sides thereof. As shown in Fig. 1, the skid members 16—16 are preferably slightly turned up at their front ends as indicated at 18, to prevent stubbing contacts with the ground whenever landing in nose down attitude with forward speed.

Thus, it will be appreciated that in ground landings the aircraft may be maneuvered so as to hoveringly descend or to land with slight forward speed so that the parallel skid members 16—16 first contact the ground; the tubular beam members 12—12 absorbing the landing shocks in bending. As shown in Fig. 1, the legs 14 are preferably disposed to incline slightly forwardly as well as downwardly, thereby effectively bracing the legs against rearwardly deflecting forces attendant landings with forward motion. It will of course be understood that the beams 12—12 will be connected to any conveniently available portions of the aircraft frame structure and arranged to extend laterally therefrom so as to provide the desired skid spring suspension effect referred to hereinabove.

For water landing purposes the undercarriage of the invention includes paired pneumatic cells 20 which are generally of cylindrical shape and fabricated of suitably water-proof and air-tight fabric such as neoprene-impregnated nylon. One such cell 20 is mounted upon each of the skid devices 16 to extend therealong above the skid device so as to be thereby protected against scuffing incidental to ground landings. In order to permit the cells 20 to be centrally disposed above the skid 16 the cells are provided with internal tunnel sleeves 22 through which the legs 14 of the undercarriage structure extend. The sleeves 22 may be formed of the same fabric as comprises the cells 20, and arranged in watertight and air-tight connection with the cells. Thus, as viewed in Figs. 3 and 5, the cells 20—20 are disposed to overlie the skids 16 in centered relation thereabove, and when not supporting the aircraft on water assume the circular sectional form thereof as shown in Figs. 3 and 5. The cells 20 are tied to the skids 16 by means of girth straps 24 which extend lengthwise from the cells 20 to partially overlap the skid 16 for attachment thereto as by means of screws 26. The flaps 24 are fixed to extend from the wall structure of the cells 20, as by means of cementing or vulcanizing or other suitable method of attachment; and thus the cells are connected to the skids 16 so as to be tied to the latter for floating the aircraft when landing or resting on water surfaces.

In order to prevent excessive sectional distortion and upward deflection of the cells relative to the skids when the cells are supporting the aircraft upon water, the cells may be provided with interior webs 28 which may be formed of any suitable tension resistant fabric to extend from positions of attachment at their lower edges in the regions of the attachment of the cells to the skids in upwardly divergent relation and longitudinally throughout the cells into suitable connections as indicated along lines 29—29 at the upper surfaces thereof. Thus, even when supporting the aircraft on water surfaces the cells 20 substantially retain their cylindrical forms, and thus provide predicted buoyancy and hydrodynamic taxiing-on-water characteristics. Also, the web devices 28—28 internally brace the cells 20 in such manner as to maintain their generally cylindrical form during flight; thereby maintaining the cells in optimum aerodynamic form during flight operations.

As illustrated by Fig. 2, the cells 20—20 are preferably foreshortened at their rear ends by increasing their width dimensions thereat so that the length of their extensions rearwardly from the center of gravity of the aircraft may be reduced, as shown in Fig. 1, without disturbing the buoyancy balance provided for the aircraft by the floats. This reduces likelihood of damage to the rear ends of the cells 20 whenever a ground landing is made in tail-low attitude; and the interior webs 28—28 are particularly useful to effectively brace the width-enlarged rear end portions of the cells 20—20 against sectional distortion. Thus, as illustrated in Fig. 4, the rear end portions of the cells 20—20 will assume flattened circular sectional forms due to the presence of the internal webs 28; and this feature of the construction facilitates foreshortening of the rear end portions of the cells as into the plan view forms thereof shown in Fig. 2. While the use of these interior webs is highly desirable for the reasons given above, they may be dispensed with in certain cases as shown in Fig. 3.

Although only one form of the invention has been shown and described in detail, it will be apparent to those skilled in the art that the invention is not so limited but that various changes may be made therein without departing from the spirit of the invention or the scope of the appended claims.

What is claimed is:

1. An aircraft undercarriage structure comprising a vertically springing support extending laterally from an aircraft body, leg means extending downwardly from the outer end of said support, ground landing skid means connected to the bottom end of said leg means and extending longitudinally of the aircraft, a flotation cell comprising a generally cylindrical pneumatic bag mounted to lie along the upper surface of said skid means, tie means interconnecting the bottom surface of said cell to said skid means, said cell having tunnel sleeves extending therethrough in the regions of said leg means whereby said leg means extend through said tunnel sleeves, and tension webs disposed interiorly of said cell and connected to the bottom portion thereof in the region of the connection of said cell to said skid means and extending in divergent vertical relation therefrom longitudinally of the interior of said cell into connection with the upper portion of said cell at spaced zones of connection extending parallel and longitudinally of the upper surface of said cell, said cell being of enlarged width dimension at the rear end thereof, whereby said web devices substantially maintain said cell in the intended vertical sectional dimension thereof when supporting the aircraft on water.

2. An aircraft undercarriage structure comprising a vertically springing support extending laterally from an aircraft body, legs extending downwardly from the outer end of said support, ground landing skid means connected to the bottom end of said legs and extending longitudinally of the aircraft, a flotation cell comprising a generally cylindrical pneumatic bag mounted to lie along the upper surface of said skid means, and tie means interconnecting the bottom surface of said cell to said skid means, said cell having tunnel sleeves extending therethrough in the regions of said legs, said legs being disposed to extend through said tunnel sleeves.

3. An aircraft undercarriage structure comprising a vertically springing support extending laterally from an aircraft body, legs extending downwardly from the outer end of said support, ground landing skid means connected to the bottom end of said legs and extending longitudinally of the aircraft, a flotation cell comprising a generally cylindrical pneumatic bag mounted to lie along the upper surface of said skid means, tie means interconnecting the bottom surface of said cell to said skid means, said cell having tunnel sleeves extending therethrough in the regions of said legs whereby said legs extend through said tunnel sleeves, and a tension web disposed interiorly of said cell and connected to the bottom portion thereof in the region of the connection of said cell to said skid means and extending in vertical relation therefrom longitudinally of the interior of said cell into connection with the upper surface of said cell.

4. An aircraft undercarriage structure comprising a vertically springing support extending laterally from an aircraft body, leg means extending downwardly from the outer end of said support, ground landing skid means connected to the bottom end of said leg means and extending longitudinally of the aircraft, a flotation cell comprising a generally cylindrical pneumatic bag mounted to lie along the upper surface of said skid means, tie means interconnecting the bottom surface of said cell to said skid means, and tension web means disposed interiorly of said cell and connected to the bottom portion thereof in the region of the connection of said cell to said skid means and extending in vertical relation therefrom longitudinally of the interior of said cell into connection with the upper surface of said cell, whereby said web means substantially maintains said cell in the intended vertical sectional dimensions thereof when supporting the aircraft on water.

5. An aircraft undercarriage structure comprising a vertically springing support extending laterally from an aircraft body, leg means extending downwardly from the outer end of said support, ground landing skid means connected to the bottom end of said leg means and extending longitudinally of the aircraft, a flotation cell comprising a generally cylindrical pneumatic bag mounted to lie along the upper surface of said skid means, tie means interconnecting the bottom surface of said cell to said skid means, said cell being of enlarged sectional dimensions at the rear end thereof and having its longitudinal mid point disposed ahead of the center of gravity of the aircraft to provide balanced buoyancy effects fore and aft of the aircraft center of gravity.

6. An aircraft undercarriage structure comprising a vertically springing support extending from an aircraft body downwardly therefrom, ground landing skid means connected to the bottom end of said support and extending longitudinally of the aircraft, a flotation cell comprising a generally cylindrical pneumatic bag mounted to lie along the upper surface of said skid means, tie means interconnecting the bottom surface of said cell to said skid means, said cell being of enlarged sectional dimensions at the rear end thereof and having its longitudinal mid point disposed ahead of the center of gravity of the aircraft to provide balanced buoyancy effects fore and aft of the aircraft center of gravity.

7. An aircraft undercarriage structure comprising a vertically springing support extending laterally from an aircraft body, leg means extending downwardly from the outer end of said support, ground landing skid means connected to the bottom end of said leg means and extending longitudinally of the aircraft, a flotation cell comprising a generally cylindrical pneumatic bag mounted to lie along the upper surface of said skid means, said cell being of enlarged sectional dimensions at the rear end thereof and having its longitudinal mid point disposed ahead of the center of gravity of the aircraft to provide balanced buoyancy effects fore and aft of the aircraft center of gravity.

8. An aircraft undercarriage structure comprising a vertically springing support extending from an aircraft body downwardly therefrom, ground landing skid means connected to the bottom end of said support and extending longitudinally of the aircraft, a flotation cell comprising a generally cylindrical pneumatic bag mounted to lie along the upper surface of said skid means, said cell being of enlarged sectional dimensions at the rear end thereof and having its longitudinal mid point disposed ahead of the center of gravity of the aircraft to provide balanced buoyancy effects fore and aft of the aircraft center of gravity.

9. An aircraft undercarriage structure comprising a support extending laterally from an aircraft body, legs extending downwardly from the outer end of said support, ground landing skid means connected to the bottom end of said legs and extending longitudinally of the aircraft, a flotation cell comprising a generally cylindrical pneumatic bag mounted to lie along the upper surface of said skid means, and tie means interconnecting the bottom surface of said cell to said skid means, said cell having tunnel sleeves extending therethrough in the regions of said legs, and said legs being disposed to extend through said tunnel sleeves.

10. An aircraft undercarriage structure comprising a support extending laterally from an aircraft body, leg means extending downwardly from the outer end of said support, ground landing skid means connected to the bottom end of said leg means and extending longitudinally of the aircraft, flotation cell means comprising generally cylindrical pneumatic bag means mounted to lie along the upper surface of said skid means, tie means interconnecting the bottom surface of said cell means to said skid means, and tension means disposed interiorly of said cell means and extending between the upper and lower surfaces of said cell means, whereby said tension means substantially maintains said cell means in the intended vertical sectional dimensions thereof when supporting the aircraft on water.

11. An aircraft undercarriage structure comprising a support extending laterally from an aircraft body, leg means extending downwardly from the outer end of said support, ground landing skid means connected to the bottom end of said leg means and extending longitudinally of the aircraft, flotation cell means comprising generally cylindrical pneumatic bag means mounted to lie along the upper surface of said skid means, said cell means being of enlarged sectional dimensions at the rear end thereof and having its longitudinal mid point disposed ahead of the center of gravity of the aircraft to provide balanced buoyancy effects fore and aft of the aircraft center of gravity.

BARTRAM KELLEY.
ERNEST G. DICKINSON.

REFERENCES CITED

The following references are of record in the file of this patent:

UNITED STATES PATENTS

| Number | Name | Date |
|---|---|---|
| 1,161,896 | Sloper | Nov. 30, 1915 |
| 1,552,111 | Clark et al. | Sept. 1, 1925 |
| 1,689,807 | Traver | Oct. 30, 1928 |
| 2,163,653 | Whittman | June 27, 1939 |
| 2,391,326 | McKinley | Dec. 18, 1945 |
| 2,493,296 | Labensky | Jan. 3, 1950 |

FOREIGN PATENTS

| Number | Country | Date |
|---|---|---|
| 893,605 | France | Feb. 14, 1944 |